United States Patent [19]

Kobayashi

[11] Patent Number: 4,754,341
[45] Date of Patent: Jun. 28, 1988

[54] SKEW JUMP CORRECTING CIRCUIT

[75] Inventor: Yasuhito Kobayashi, Kanagawa, Japan

[73] Assignee: Fuji Photo Film Co., Ltd., Minami-ashigara, Japan

[21] Appl. No.: 847,318

[22] Filed: Apr. 2, 1986

[30] Foreign Application Priority Data

Apr. 2, 1985 [JP] Japan ................................ 60-69806

[51] Int. Cl.$^4$ .............................................. H04N 5/95
[52] U.S. Cl. ..................................... 358/337; 358/342
[58] Field of Search ............... 358/312, 313, 327, 335, 358/337, 325; 360/10.1, 10.3, 11.1, 36.1

[56] References Cited

U.S. PATENT DOCUMENTS

4,468,709 8/1984 Kenjyo ................................ 358/325
4,623,940 11/1986 Matsumoto et al. ............... 360/10.3

Primary Examiner—Donald McElheny, Jr.
Attorney, Agent, or Firm—Cushman, Darby & Cushman

[57] ABSTRACT

A skew jump correcting circuit for correcting a skew jump having a constant time interval between successive field signals in which the field signals are delayed in a variable delay line by a first delay period of time immediately after a switching point near the time the skew jump occurs, the amount of delay being gradually changed thereafter so that immediately before the next switching point the field signal is delayed by a second delay.

24 Claims, 5 Drawing Sheets

SKEW JUMP CORRECTING CIRCUIT

BACKGROUND AND SUMMARY OF THE INVENTION

1. Field of the Invention

This invention relates to a skew jump correcting circuit for providing sharp and clear pictures free from flickering.

2. Background

In recording video signals on magnetic tapes, magnetic disks or other recording media, in general signals of one frame are alloted to one track or the signals of one field are alloted to one track. The 1-field/1-track recording system includes a 1-frame/2-track recording system in which odd-number fields and even-number fields are alternately recorded, and a field recording system in which only odd-number fields or only even-number fields are recorded.

Figures 5A, 5B:
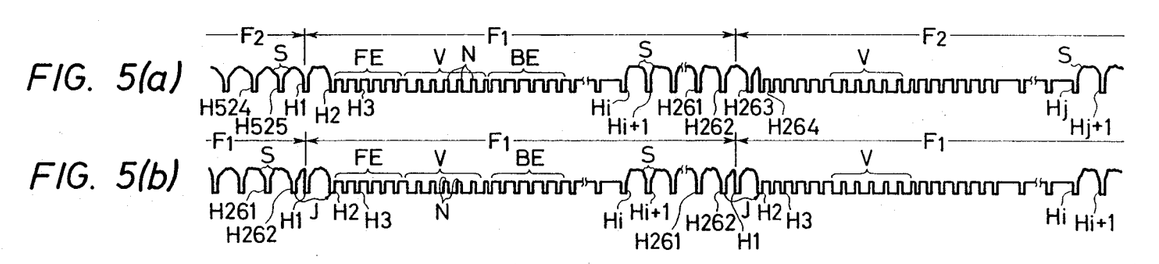
FIG. 5 is a time chart for comparison of a reproducing field signal in a 1-frame/2-track recording system with that in a field recording system.

In reproduction according to the 1-frame/2-track recording system, odd-number field signals F1 and even number field signals F2 are successively reproduced from the track as shown in the part (a) of FIG. 5 and are used alternately for the field scanning of the screen of the television set, so that frame scanning is carried out in an interlaced scanning mode. On the other hand, in reproduction according to the field recording system, vertical correlation of video signals is utilized, and one kind of signal produced repeatedly from one and the same track, such as an odd-number field signal F1 as shown in the part (b) of FIG. 5, is converted into a frame signal, to perform frame scanning.

Accordingly, in the field recording system, recording density is twice as high as that in the 1-frame/2-track recording system, with the result that recording is lengthy for motion pictures and the number of frames can be increased for still pictures.

However, in reproduction according to the field recording system, the following difficulty is encountered when the field signal is converted into the frame signal. One field consists of 262.5 horizontal scanning periods. Therefore, if field scanning is carried out repeatedly with the same field signal F1, then the horizontal synchronizing signal interval jumps by 0.5 H (H=horizontal scanning period) when the end part of the field signal F1 is followed by the beginning part as indicated by the arrow J in part (b) of FIG. 5. This jump is too large for the horizontal synchronization AFC of the television set to pull in. Therefore, the synchronization becomes irregular, as a result of which the upper portion of the reproduced picture is shifted sidewardly, that is, so-called "skew distortion" occurs with the reproduced picture.

Figure 6:
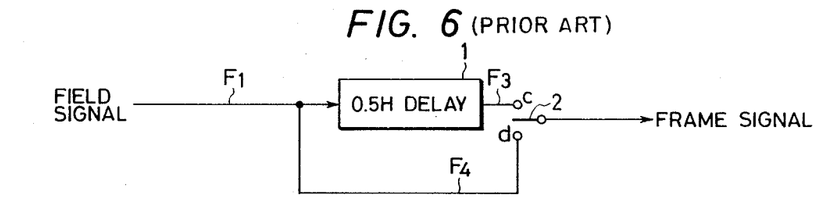
FIG. 6 is a block diagram showing a conventional skew jump correcting circuit.
Figure 7:
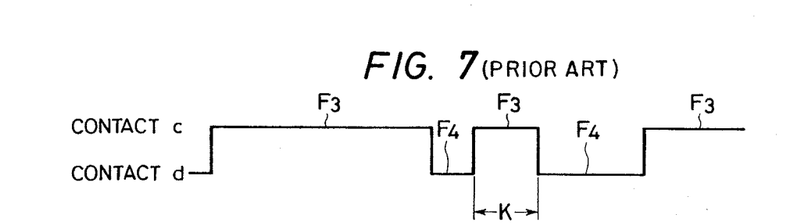
FIG. 7 is a time chart indicating the operation timing of the circuit shown in FIG. 6.

In order to overcome this difficulty, heretofore the following method has been employed. As shown in FIG. 6, the same field signal F1 produced repeatedly from one and the same track is applied to a 0.5 H delay line 1. Every vertical scanning period (IV), the through field signal F3 and the 0.5 H delayed field signal F4 are alternately selected by an analog switch 2, so that the odd-number field signal F3 and the even-number field signal F4, which are similar to the odd-number field signal F1 and the even-number field signal F2 shown in FIG. 5, are combined to provide a frame signal having continuous horizontal synchronizing signal intervals for the interlaced scanning. In this case, the vertical synchronizing signal interval is changed by 0.5 H from 1V. In order to overcome this drawback, the contacts c and d of the analog switch 2 are selected as shown in FIG. 7. That is, of the through field signal F3 selecting period, the part K between the front equalizing pulse interval and the rear equalizing pulse interval is utilized for selection of the 0.5 H delayed field signal F4.

In FIG. 5, reference character S designates a video signal; FE, a front equalizing pulse; V, a vertical synchronizing signal; BE, a back equalizing pulse; N, a slot pulse; and H1 through H525, horizontal synchronizing signals.

The above-described prior art suffers from the following difficulties. Because of the temperature characteristic, transfer efficiency and transfer noise of the 0.5 H delay line 1, the 0.5 H delayed field signal F4 is attenuated, limited in band width or lowered in S/N ratio. Furthermore, as the offset voltages at the contacts c and d of the analog switch 2 are different from each other, in the resultant frame signal the odd-number field signal F3 and the even-number field signal F4 are different especially in level from each other. As a result, the produced picture flickers.

These difficulties occur not only with the reproduction of a still video according to the field recording system, but also with the still picture reproduction according to the recording system for video tape recorders in which a so-called "H arrangement" (that the horizontal synchronizing signals of adjacent tracks are arranged perpendicularly to the tracks) is shifted. That is, in the recording system in which the horizontal synchronizing signals of adjacent tracks are shifted by 0.25 H or 0.75 H from each other, in the reproduction a skew jump of 0.5 H occurs every two fields, resulting in skew distortion. Therefore, similarly as in the case of FIG. 6, a 0.5 H delay line and an analog switch are provided, so that the continuity of the horizontal synchronizing signal intervals is maintained by switching the through reproducing video signal and the 0.5 H delayed reproducing video signal. However, in this case also, the through reproducing video signal and the 0.5 H delayed reproducing video signal are different in level, with the result that the reproduced picture flickers.

In view of the foregoing, an object of this invention is to provide a circuit which, when the field signal is repeatedly reproduced, can correct the discontinuity (skew jump) of the horizontal synchronizing signal intervals without causing the reproduced picture to flicker.

SUMMARY OF THE INVENTION

The foregoing object of the invention has been achieved by the provision of a skew jump correcting circuit which, according to the invention, includes a variable delay line in which a field signal is delayed by a first delay period of time immediately after a switching point provided near the time instant the skew jump occurs. The amount of the delay of the field signal is gradually changed, thereafter, and immediately before the next switching point and the field signal is delayed by a second delay period of time which is obtained by adding the time interval (constant) of the skew jump to the first delay period of time or by subtracting the time interval of the skew jump from the first delay period of time.

In the invention, the term "field signal" is intended to mean a single or plural units of field signals continuous in time, thus including the same field signal repeatedly reproduced from one track and a plurality of field signals repeatedly reproduced from one track and a plurality of field signals repeatedly reproduced from a plurality of adjacent tracks.

Further in the invention, the term "skew jump" is intended to mean the discontinuity of horizontal synchronizing signal intervals which causes a skew distortion in the reproduced picture, and the term "switching point" is intended to mean the time instant at which the amount of delay of the field signal is changed from the second delay period of time over to the first delay period of time.

A field signal having a time interval corresponding to the second delay period of time is inputted to the variable delay line at a transfer speed corresponding to the second delay period of time immediately before the switching point, and is outputted at a transfer speed corresponding to the first delay period of time immediately after the switching point, whereby the field signal is time-compressed or time-expanded. As the amount of time compression or time expansion is the difference between the second delay period of time and the first delay period of time; i.e., the time interval of the skew jump, no skew jump occurs with the delayed field signal which is provided at the output terminal of the variable delay line.

For the period of time between one switching point and the next switching point, the horizontal synchronizing signal interval of the delayed field signal is slightly changed as the delay time increases or decreases. However, since the amount of change is the quotient of the time interval of the skew jump divided by the field period; i.e., it is extremely small, the acquisition of synchronism is positively achieved by the horizontal synchronization AFC of the television set.

One kind of delayed field signal from which the skew jump has been eliminated is applied to the television set, so that a non-interlace field/frame scanning operation is carried out.

DETAILED DESCRIPTION OF THE DRAWINGS

Figure 1:
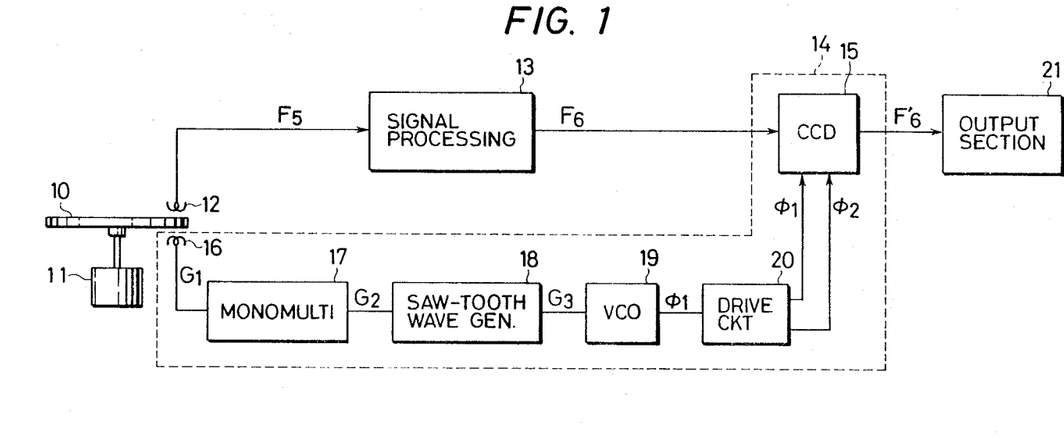
FIG. 1 is a block diagram showing one embodiment of the invention in which the technical concept of the invention is applied to a still picture reproducing device.
Figure 2A:
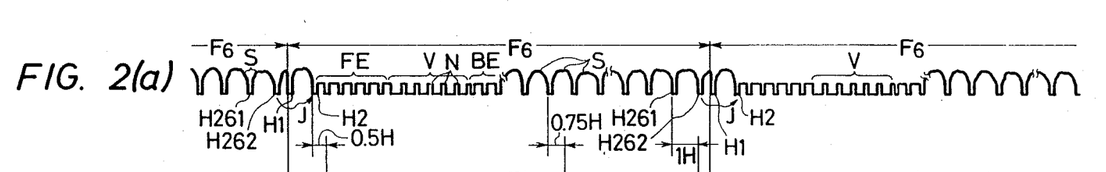
FIG. 2, consisting of (a)-(g), is a time chart showing the waveforms of a variety of signals in FIG. 1.
Figures 2B, 2C, 2D:
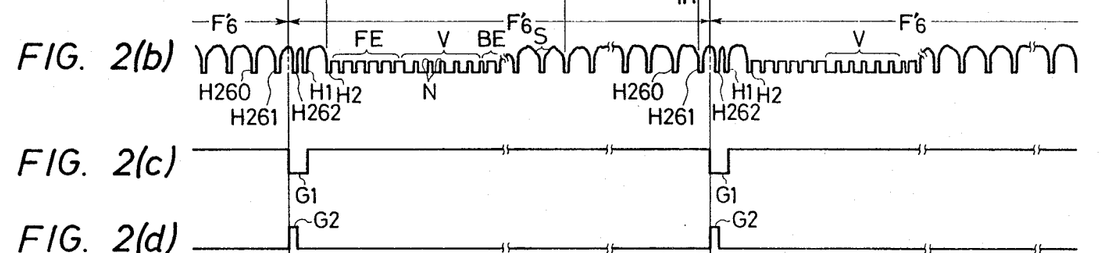
Figure 2E:
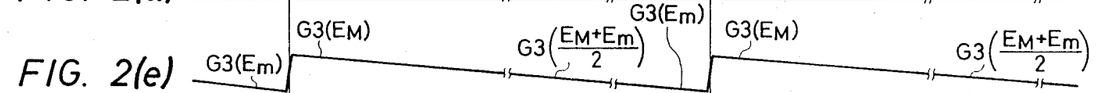
Figure 2F:
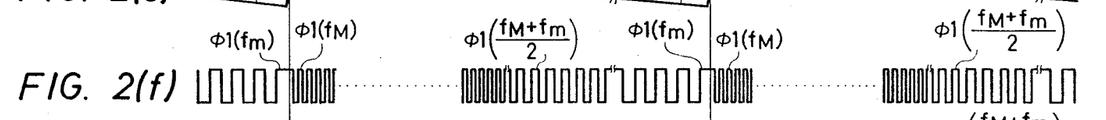
Figure 2G:
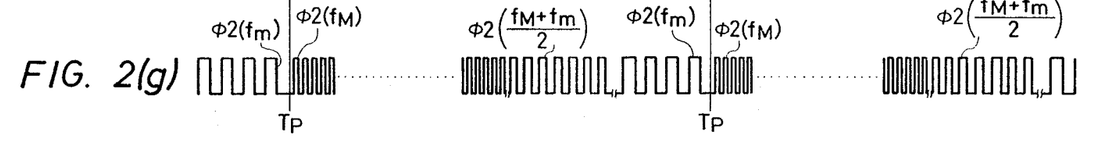
Figure 3A:
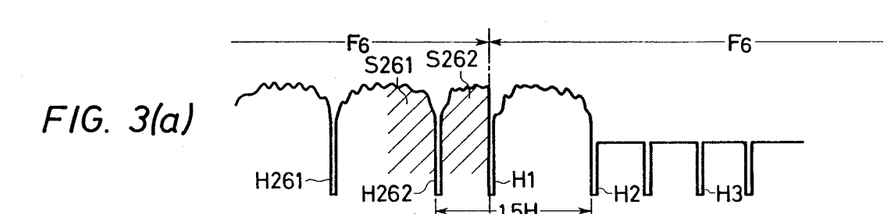
FIG. 3, consisting of (a)-(d), is a time chart indicating the time compression of a field signal at a switching point in the embodiment.
Figure 3B:
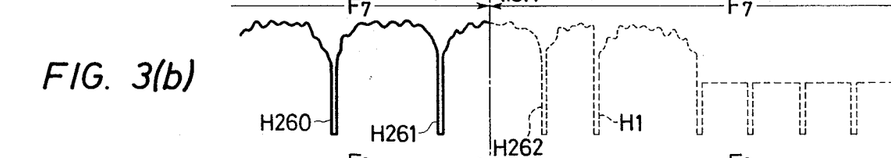
Figure 3C:
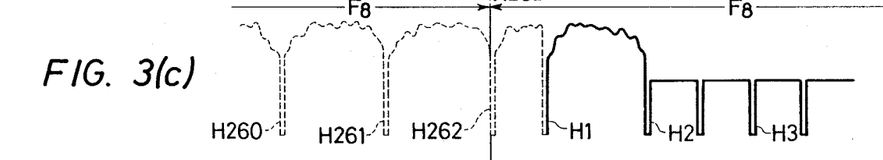
Figure 3D:
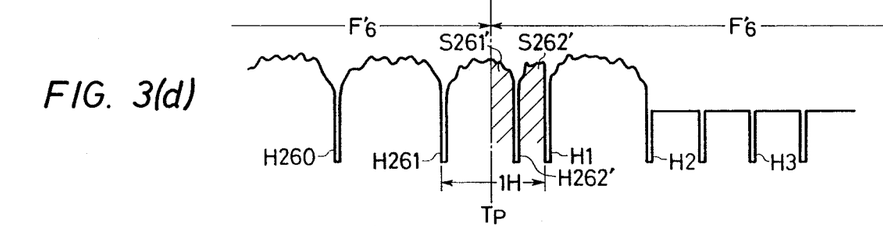
Figure 4A:
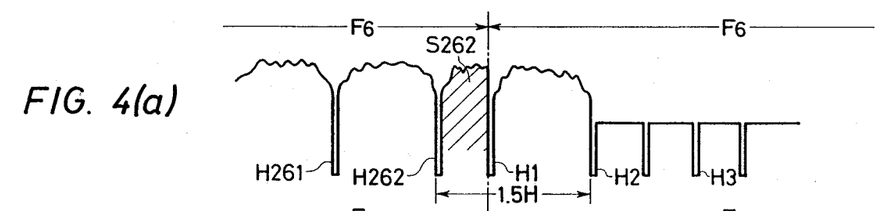
FIG. 4, consisting of (a)-(d), is a time chart indicating the time expansion of a field signal at a switching point in one modification of the embodiment.
Figure 4B:
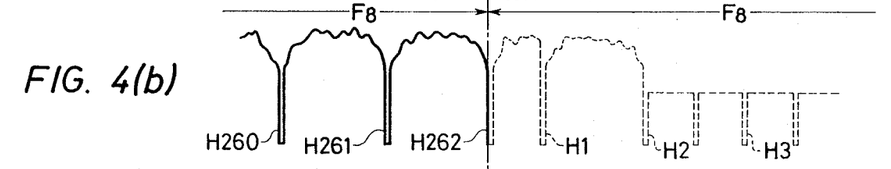
Figure 4C:
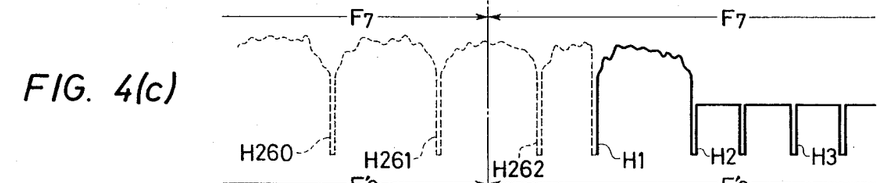
Figure 4D:
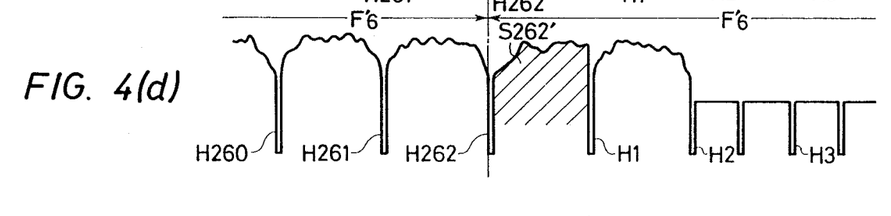

FIG. 1 shows the arrangement of one example of a still picture reproducing device to which the technical concept of the invention is applied. As shown in FIG. 1, a magnetic disk 10 is rotated by a spindle motor 11 at a predetermined speed, for instance 3,600 rpm. A plurality of tracks, for instance fifty tracks, are provided on the disk 10, and a field signal of one field (for instance an odd number field) is recorded on each track. A video head 12 is positioned above the disk 10. As the disk 10 is rotated, the head 12 scans the selected track repeatedly. An RF signal F5 outputted by the head 12 is supplied to a signal processing section 13 which comprises a preamplifier, a filter circuit, a demodulator circuit, a deemphasis circuit, and a video amplifier circuit. In the signal processing section 13, a reproduction field signal F6 is produced repeatedly as shown in part (a) of FIG. 2. The start point of the field signal F6 is earlier by 4 H than the vertical synchronizing signal; however, it can be optionally set. In part (a) of FIG. 2, reference character S designates a video signal; FE, front equalizing pulses; BE, back equalizing pulses; N, slot pulses; and H1 through H262, horizontal synchronizing signals.

Even if a still picture is formed by field-scanning (non-interlace) with the same field signal F6 which is provided repeatedly, a skew jump of 0.5 H occurs between horizontal synchronizing signals as indicated by the arrow J in the part (a) of FIG. 2 whenever a field signal F6 is followed by the next field signal F6, and therefore a skew distortion occurs as was described before. The same thing can be said of the case where the field scanning (non-interlace) is carried out with the field signal of an even number field produced continuously.

However, according to the embodiment of the invention, the field signal F6 is applied to a CCD (charge-coupled device) 15 in a variable delay line 14, so that the signal F6 is converted into a field signal F6' as shown in the part (b) of FIG. 6 in which the skew jump has been corrected. The field signal F6' is applied to the television set through an output section 21 of an amplifier circuit and mixer circuit.

The variable delay line 14 includes a PG head 16, a monostable multi-vibrator 17, a saw-tooth wave generating circuit 18, a voltage-controlled oscillator (VCO) 19, a drive circuit 20, and the CCD 15.

The PG head 16 detects leakage flux from a PG yoke provided for the disk 10, to produce a PG pulse G1 (the part (c) of FIG. 2) representing the rotational phase of the disk 10. In the embodiment, the PG pulse G1 is produced at the start point of the field signal F6, thus defining the switching point Tp.

The PG pulse G1 is applied to the monostable multi-vibrator 18, where it is shaped into a trigger pulse G2 which rises at the fall of the PG pulse G1 and is small in pulse width.

The trigger pulse G2 is applied, as a trigger input, to the saw-tooth wave generating circuit 18. The saw-tooth wave generating circuit 18 outputs a saw-tooth wave signal G3 as shown in part (e) of FIG. 2. That is, the signal G3 rises abruptly to the maximum level EM from the minimum level Em at the switching point Tp, and falls linearly for the period of one field, and reaches the minimum level Em immediately before the next switching point Tp.

The saw-tooth wave signal G3 is applied, as a control voltage, to the VCO 19. The VCO 19 outputs a clock pulse $\phi 1$ having a frequency which is proportional to the instantaneous level of the sawtooth wave signal G3 as shown in the part (f) of FIG. 2. That is, the frequency of the clock pulse $\phi 1$ is maximum (fM) immediately after the switching point Tp, thereafter decreases linearly, and becomes minimum (fm) immediately before the next switching point Tp. In the embodiment, the maximum level EM and the minimum level Em of the saw-tooth wave signal G3 are so determined that the maximum frequency fM is 14.3 MHz and the minimum frequency fm is 7.16 MHz.

The clock pulse φ1 outputted by the VCO 19 is applied to the drive circuit 20. The drive circuit 20 provides clock pulses φ1 and φ2 of two phases as shown in parts (f) and (g) of FIG. 2. These clock pulses are supplied to the two-phase CCD 14. As conducive to an understanding of the invention, in FIG. 2 the clock pulses φ1 and φ2 are shown with the frequencies exaggerated.

In the CCD 15, the field signal F6 from the signal processing section 13 is applied, as the signal charge, to the transfer electrode or the potential well right below the gate, and the gates are driven with the clock pulses φ1 and φ2 to transfer the signal charge to the output terminal, thereby to delay the field signal F6 in the analog mode.

The delay time D of the field signal F6 by the CCD 15 is proportional to the number of gates (n) thereof, and is inversely proportional to the frequency (f) of the clock pulse φ1. That is, $D=n/f$. In the embodiment, the number of gates (n) of the CCD 15 is 455. Therefore, the delay time D is minimum 0.5 H (31.78 μs) immediately after the switching point Tp (or at the start of the field) at which the clock frequency becomes maximum fM, and thereafter increases linearly, and becomes maximum 1 H (63.5 μs) immediately before the switching point Tp (or at the end of the field) at which the clock frequency f becomes minimum fm (7.16 MHz). At the midpoint of the field, the delay time D is the middle value (0.75) H) between the minimum value (0.5 H) and the maximum value (1 H).

Therefore, as is apparent from the parts (a) and (b) of FIG. 2, the field signal F6' provided at the output terminal of the CCD 15 is delayed by 0.5 H from the input field signal F6 immediately after the switching point Tp. Thereafter, the delay is increased linearly; that is, the field signal F6' is delayed by 0.75 H at the middle of the field, and by 1 H immediately before the next switching point Tp. And the field signal F6' is delayed by 0.5 H immediately after the switching point Tp.

The delay time D is changed from 1 H to 0.5 H at the switching point Tp, as was described above. That is, the end part of the input field signal F6 is time-compressed, with the result field signal F6 is converted into the field signal F6.

This will be described with reference to FIG. 3 in more detail. Part (a) of FIG. 3 shows the field signal F6. Part (c) of FIG. 3 shows the phantom field signal F8 which is delayed by 0.5 H from the field signal F6. The part (d) of FIG. 3 shows the delayed field signal F6'.

Immediately before the switching point Tp, the delay time D is 1 H, and therefore the delayed field signal F6' is similar in waveform to the phantom field signal F7 which is delayed by 1 H. At the switching point Tp, the delay time D is switched over to 0.5 H, and therefore the delayed field signal F6' becomes similar in waveform to the phantom field signal F8 which is delayed by 0.5 H. In this connection, it should be noted that the delayed field signal does not instantaneously become similar to the field signal which is delayed by 0.5 H. That is, when the delay time D is switched, i.e., when the clock frequency f is changed, the signal charge corresponding to the last 1 H period (shaded in the part (a) of FIG. 3) of the field signal F6 is outputted from the CCD 15, and then the delayed field signal becomes similar to the field signal which is delayed by 0.5 H.

The signal charge corresponding to the 1 H period is inputted to the CCD 15 with a clock frequency of 7.16 MHz, and transferred with a clock frequency of 14.3 MHz. Therefore, the signal charge is outputted as a signal waveform which is time-compressed by 0.5 H. For instance, the signal charge corresponding to the horizontal synchronizing signal H262 arrives at the gate of the middle stage (around the 227th) in the CCD 15 at the switching point Tp, and is transferred therefrom with a clock frequency of 14.3 mHz. The signal charge is outputted, as the horizontal synchronizing signal H262' of the delayed field signal F6', by the CCD 15 after the lapse of 0.25 H from the switching point. The horizontal synchronizing signal H1 of the field signal F6 is inputted, as a signal charge, into the CCD 15 at the switching point Tp, and the signal charge is transferred with a clock frequency of 14.3 MHz. Therefore, the horizontal synchronizing signal H1' of the delayed field signal F6' is outputted by the CCD 15 after the lapse of 0.5 H from the switching point Tp.

As is apparent from the above description, after the lapse of 0.5 H from the switching point Tp the delayed field signal F6' becomes similar in waveform to the phantom field signal F8 which is delayed by 0.5 H. As a result, the horizontal synchronizing signal interval (H262–H1) of the delayed field signal F6', before and after the switching point Tp, becomes 1 H, so that the skew jump is eliminated.

Thereafter, the delay of the field signal F6' increases gradually. As shown in FIG. 2, the field signal F6' is delayed by 0.75 H from the field signal F6 at the midpoint of the field (i.e., after the lapse of about 113 H from the switching point Tp), and delayed by 1 H immediately before the next switching point Tp. At that switching point, the switching operation is carried out in the same manner as described above.

The delayed field signal F6' outputted by the CCD 15 is applied through the above-described output section 21 to the television set. In the embodiment, the non-interlace field/frame scanning is carried out with one kind of delayed field signal F6'. Therefore, even if the field signal F6 is lowered in quality (for instance attenuated, limited in band, or decreased in S/N ratio) in the CCD 15, the picture on the screen will never flicker. As was described above, when the scanning is returned from the end part of the field signal to the beginning part, the continuity of the horizontal synchronizing signal interval is maintained, and therefore no skew distortion occurs. For each field period, the time interval of the horizontal synchronizing signals H1 through H262 of the delayed field signal F6' is not constant, i.e., it changes slightly with the clock frequency f of the CCD 15; however, the change is, in average, 0.5 H/262.5=0.3%, and therefore the acquisition of synchronism can be sufficiently obtained with the horizontal synchronization AFC of the television set. Even if the horizontal synchronization signal is shifted on the order of ±4%, the acquisition of synchronism can be obtained with the horizontal synchronization AFC of the television set. Therefore, the picture is free from the skew distortion during the interfield period. The switching point Tp occurs with the lowermost part of the picture. Therefore, the time compression of a video signal of 1 H into that of 0.5 H does not affect the picture at all.

In the above-described embodiment, the delay time D with respect to the input field signal F6 is 0.5 H immediately after a switching point, increases linearly thereafter, and 1 H immediately before the next switching point; however, the invention is not limited thereto or thereby. For instance, the delay time D may be such that it is 0.6 H immediately after the switching point, increases linearly thereafter, and 1.1 H immediately before the next switching point. All that is necessary is that the delay time D is gradually increased by a period of time (0.5 H) corresponding to the amount of skew jump (0.5 H in the above-described embodiment) during the field period (1V) between a switching point and the next switching point, and is switched over to the first delay time at the next switching point. In this case, the end part of the field signal is time-compressed by 0.5 H, and therefore the horizontal synchronizing signal interval (H261–H1) is changed from 1.5 H into 1 H, as a result of which the skew jump is eliminated.

In the above description, the field signal is delayed by a first delay period of time immediately after the switching point which is provided near the time instant the skew jump occurs, the amount of delay with respect to the field signal is gradually increased thereafter, and immediately before the next switching point the field signal is delayed by a second delay period of time which is the sum of the first delay period of time and the time interval (constant) of the skew jump; that is, the skew jump is corrected by the time-compression of the field signal. However, the skew jump may be corrected by the time-expansion of the field signal.

That is, in this method, the field signal is delayed by a first delay period of time immediately after the switching point which is provided near the time instant the skew jump occurs, the delay time with respect to the field signal is gradually decreased thereafter, and immediately before the next switching point the field signal is delayed by a second delay period of time which is the difference between the first delay period of time and the time interval (constant) of the skew jump, whereby the skew jump is corrected.

The method can be realized by modifying the saw-tooth wave generating circuit 18 in FIG. 1 as follows. That is, the circuit 18 is so designed that it produces the saw-tooth wave signal G3 which is opposite to that shown in part (e) of the FIG. 2; i.e., the saw-tooth wave signal G3 which falls from the maximum level EM to the minimum lever Em at the switching point Tp, and its level increases linearly for one field period thereafter and becomes the maximum level EM immediately before the next switching point Tp.

In this case, the delay time D is switched from 0.5 H over to 1 H at the switching point Tp, as a result of which, as shown in FIG. 4, the last 0.5 H part of the input field signal F6 (the part (a) of FIG. 4) is time-expanded into a 1 H one, whereby the delayed field signal F6' (the part (d) of FIG. 4) is obtained; that is, the skew jump is eliminated. Part (b) of FIG. 4 shows the phantom field signal F8 which is delayed by 0.5 H from the field signal F6, and part (c) of FIG. 4 shows the phantom field signal F7 which is delayed by 1 H from the field signal F6.

It is not always necessary that the switching point is positioned at the start point of the field signal; that is, it may be positioned near the start point. In addition to the above-described two-phase CCD, a variety of CCDs such as a three-phase CCD and a four-phase CCD may be employed as the CCD delay element.

The above-described embodiment relates to a still picture reproducing device adapted to reproduce field records; however, it should be noted that the technical concept of the invention is applicable to a still picture reproduction according to the recording system for video tape recorders in which the "H arrangement" is shifted. If, in this case, a skew jump of 0.5 H occurs every two fields, then during the two-field period between the switching point provided near the time instant, the skew jump occurs and at the next switching point the amount of delay is gradually changed from the first delay period of time to the second period of time longer by 0.5 H than the first delay period of time, and at the next switching point the amount of delay is switched over to the first delay period of time.

In the invention, the field signal is delayed by the first delay period of time immediately after the switching point provided at the time instant the skew jump occurs, its delay time is gradually changed thereafter, and the field signal is changed by the second delay period of time which is the sum of the first delay period of time and the amount (time interval) of skew jump or the difference therebetween immediately before the next switching point. When the amount of delay is switched over to the first delay period of time immediately after the next switching point, the field signal time-compressed or time-expanded by the time interval corresponding to the skew jump is outputted by the variable delay line. Therefore, the skew jump is eliminated; that is, no skew distortion occurs. The amount of delay of the field signal is gradually increased or decreased throughout the field period, and therefore the acquisition of synchronism is positively achieved by the horizontal synchronization AFC of the television set, and the horizontal synchronization will never become irregular during the field period. Furthermore, the employment of one kind of field signal for scanning the picture eliminates the flickering phenomenon which occurs heretofore when the scanning operation is carried out by alternately using the through and delayed field signals.

What is claimed is:

1. A circuit for correcting a constant time interval skew jump, otherwise occurring between successive fields of a video signal, comprising:
    variable delay means for:
    (1) delaying those initial portions of a video field immediately following a skew jump, by a first delay period of time;
    (2) delaying following portions of the video field by gradually increasing amounts, so that ultimately the portions of the video field immediately preceding the succeeding skew jump have been delayed by a second delay period of time, the difference between the second delay period of time and the first delay period of time equaling the skew jump time interval;
    (3) repeating steps (1) and (2) for succeeding video fields; and
    means for applying the delayed field signal to a display.

2. A skew jump correcting circuit as in claim 1, wherein the constant time interval skew jump is 0.5 H (where H is the horizontal scanning period), the first delay period of time is 0.5 H and the second delay period of time is 1 H.

3. A skew jump correcting circuit as in claim 1, in which the variable delay means includes:
    means for generating a timing signal indicating a field start point;

means for generating a clock signal having a frequency which varies in proportion to the instantaneous voltage level applied to an input thereof;

means, triggered by the timing signal, for generating the voltage signal to control the clock signal generating means, the voltage signal so generated:
(i) assuming a first voltage level immediately following the skew jump;
(ii) gradually increasing throughout the duration of the video field;
(iii) assuming a second voltage level immediately preceding the succeeding skew jump, the second voltage level being greater than the first voltage level; and
(iv) the voltage signal repeating steps (i)–(iii) for each succeeding field;

means for generating clock pulses of plural phases which are defined by said clock signal; and an analog delay element controlled by the clock pulses which receives, delays, and transfers the field signal.

4. A skew jump correcting circuit as in claim 3, wherein said voltage signal generating means generates a sawtooth wave signal which assumes a first value immediately after a skew jump, linearly increases throughout the video field, assumes a second value immediately preceding the succeeding skew jump, and repeats the foregoing steps for each succeeding field.

5. A skew jump correcting circuit as in claim 1, wherein the gradual increase in delay of the field signal does not increase successive horizontal scanning time periods by more than 4%.

6. A skew jump correcting circuit as in claim 1 wherein the gradual increase in delay of the field signal does not increase successive horizontal scanning time periods by more than 0.3%.

7. A circuit for correcting a constant time interval skew jump, otherwise occurring between successive fields of a video signal, comprising:
variable delay means for:
(1) delaying those initial portions of a video field immediately following a skew jump by a first delay period of time;
(2) delaying following portions of the video field by gradually decreasing amounts, so that ultimately the portions of the video field immediately preceding the succeeding skew jump have been delayed by a second delay period of time, the difference between the first delay period of time and the second delay period of time equaling the skew jump time interval; and
(3) repeating steps (1) and (2) for succeeding video fields; and
means for applying the delayed field signal to a display.

8. A skew jump correcting circuit as in claim 7, wherein the constant time interval skew jump is 0.5 H (where H is the horizontal scanning period), the first delay period of time is 1.0 H, and the second delay period of time is 0.5 H.

9. A skew jump correcting circuit as in claim 7, in which the variable delay means includes:
means for generating a timing signal indicating a field start point;
means for generating a clock signal having a frequency which varies in proportion to the instantaneous voltage level applied to an input thereof;

means, triggered by the timing signal, for generating the voltage signal to control the clock signal generating means, the voltage signal so generated:
(i) assuming a first voltage level immediately following the skew jump;
(ii) gradually decreasing throughout the duration of the video field;
(iii) assuming a second voltage level immediately preceding the succeeding skew jump, the second voltage level being lesser than the first voltage level; and
(iv) the voltage signal repeating steps (i)–(iii) for each succeeding field;

means for generating clock pulses of plural phases which are defined by said clock signal; and an analog delay element controlled by the clock pulses which receives, delays, and transfers the field signal.

10. A skew jump correcting circuit as in claim 9, wherein said voltage signal generating means generates a sawtooth wave signal which assumes a first value immediately after a skew jump, linearly decreases throughout the video field, assumes a second value immediately preceding the succeeding skew jump, and repeats the foregoing steps for each succeeding field.

11. A skew jump correcting circuit as in claim 7, wherein the gradual decrease in delay of the field signal does not decrease successive horizontal scanning time periods by more than 4%.

12. A skew jump correcting circuit as in claim 7 wherein the gradual decrease in delay of the field signal does not decrease successive horizontal scanning time periods by more than 0.3%.

13. A method for correcting a constant time interval skew jump, otherwise occurring between successive fields of a video signal, comprising:
(1) delaying those initial portions of a video field immediately following a skew jump, by a first delay period of time;
(2) delaying following portions of the video field by gradually increasing amounts, so that ultimately the portions of the video field immediately preceding the succeeding skew jump have been delayed by a second delay period of time, the difference between the second delay period of time and the first delay period of time equaling the skew jump time interval;
(3) repeating steps (1) and (2) for succeeding video fields; and
(4) applying the delayed field signal to a display.

14. A skew jump correcting method as in claim 13, wherein the constant time interval skew jump is 0.5 H (where H is the horizontal scanning period), the first delay period of time is 0.5 H and the second delay period of time is 1 H.

15. A method as in claim 13, wherein the gradual increase in delay of the field signal does not increase successive horizontal scanning time periods by more than 4%.

16. A method as in claim 13, wherein the gradual increase in delay of the field signal does not increase successive horizontal scanning time periods by more than 0.3%.

17. Method for correcting a constant time interval skew jump, otherwise occurring between successive fields of a video signal, comprising:
generating, from an input video signal, a timing signal indicating a video field start point;

generating a clock signal which varies in proportion to the instantaneous applied voltage level;

generating, in response to the timing signal, a voltage signal to control the clock signal, the voltage signal so generated:

(i) assuming a first voltage level immediately following the skew jump;

(ii) gradually increasing throughout the duration of the video field;

(iii) assuming a second voltage level immediately preceding the succeeding skew jump, the second voltage level being greater than the first voltage level; and (iv) the voltage signal repeating steps (i)–(iii) for each succeeding field;

generating clock pulses of plural phases which are defined by the clock signal;

using the clock pulses to control an analog delay device, to receive, delay, and transfer the field signal; and applying the delayed, skew corrected, field signal to a display.

18. A method as in claim 17, wherein the generated voltage signal is a saw-tooth wave signal which assumes a first value immediately after a skew jump, linearly increases throughout the video field, assumes a second value immediately preceding the succeeding skew jump, and repeats the foregoing steps for each succeeding field.

19. A method for correcting a constant time interval skew jump, otherwise occurring between successive fields of a video signal, comprising:

(1) delaying those initial portions of a video field immediately following a skew jump by a first delay period of time;

(2) delaying following portions of the video field by gradually decreasing amounts, so that ultimately the portions of the video field immediately preceding the succeeding skew jump have been delayed by a second delay period of time, the difference between the first delay period of time and the second delay period of time equaling the skew jump time interval; and (3) repeating steps (1) and (2) for succeeding video fields; and (4) applying the delayed field signal to a display.

20. A skew jump correcting method as in claim 19, wherein the constant time interval skew jump is 0.5 H (where H is the horizontal scanning period), the first delay period of time is 1.0 H, and the second delay period of time is 0.5 H.

21. A method as in claim 19, wherein the gradual decrease in delay of the field signal does not decrease successive horizontal scanning time periods by more than 4%.

22. A method as in claim 19, wherein the gradual decrease in delay of the field signal does not decrease successive horizontal scanning time periods by more than 0.3%.

23. Method for correcting a constant time interval skew jump, otherwise occurring between successive fields of a video signal, comprising:

generating, from an input video signal, a timing signal indicating a video field start point;

generating a clock signal which varies in proportion to the instantaneous applied voltage level;

generating, in response to the timing signal, a voltage signal to control the clock signal, the voltage signal so generated:

(i) assuming a first voltage level immediately following the skew jump;

(ii) gradually decreasing throughout the duration of the video field;

(iii) assuming a second voltage level immediately preceding the succeeding skew jump, the second voltage level being lesser than the first voltage level; and (iv) the voltage signal repeating steps (i)–(iii) for each succeeding field;

generating clock pulses of plural phases which are defined by the clock signal;

using the clock pulses to control an analog delay device, to receive, delay, and transfer the field signal;

applying the delayed, skew corrected, field signal to a display.

24. A method as in claim 23, wherein the generated voltage signal is a saw-tooth wave signal which assumes a first value immediately after a skew jump, linearly decreases throughout the video field, assumes a second value immediately preceding the succeeding skew jump, and repeats the foregoing steps for each succeeding field.

* * * * *